United States Patent
Kalwa et al.

(10) Patent No.: US 7,471,467 B1
(45) Date of Patent: Dec. 30, 2008

(54) CELL PHONE/MAGNIFICATION SYSTEM

(76) Inventors: Bruce Kalwa, 2415 Indian Trail E., Palm Harbor, FL (US) 34683; Gail P. O'Connor, 1451 Gulf Blvd. #211, Clearwater, FL (US) 33767

(*) Notice: Subject to any disclaimer, the term of this patent is extended or adjusted under 35 U.S.C. 154(b) by 0 days.

(21) Appl. No.: 11/372,805

(22) Filed: Mar. 10, 2006

Related U.S. Application Data

(60) Provisional application No. 60/660,257, filed on Mar. 10, 2005.

(51) Int. Cl.
*G02B 27/02* (2006.01)
(52) U.S. Cl. .................. 359/802; 359/803; 359/804
(58) Field of Classification Search ................ 359/436, 359/440, 441, 642, 798, 802; D16/100, 130, D16/135
See application file for complete search history.

(56) References Cited

U.S. PATENT DOCUMENTS

| | | | | |
|---|---|---|---|---|
| 2,172,432 A | * | 9/1939 | Brodsky | .................. 194/295 |
| 5,867,795 A | * | 2/1999 | Novis et al. | .................. 455/566 |
| 6,389,268 B1 | * | 5/2002 | Snyder | .................. 455/90.1 |
| 2004/0204204 A1 | * | 10/2004 | Brilliant et al. | .......... 455/575.1 |
| 2005/0141185 A1 | * | 6/2005 | O'Neal et al. | .............. 361/683 |
| 2006/0035684 A1 | * | 2/2006 | Guo | ................ 455/575.1 |
| 2006/0171044 A1 | * | 8/2006 | Carnevali | ................ 359/802 |

FOREIGN PATENT DOCUMENTS

JP        2000253116 A  *  9/2000

* cited by examiner

*Primary Examiner*—Jessica T Stultz
*Assistant Examiner*—Mahidere S Sahle

(57) ABSTRACT

A magnifying glass has a size essentially equal to the size of a display panel of a cell phone or other digital device. A coupling assembly has an interior. The interior is adapted to be coupled with respect to a cell phone. The coupling assembly has an exterior. The exterior is coupled to the magnifying glass. In this manner the cell phone is coupled to the magnifying glass during the movement of the magnifying glass with respect to a display panel of a cell phone.

1 Claim, 4 Drawing Sheets

CELL PHONE/MAGNIFICATION SYSTEM

RELATED APPLICATION

This application claims the benefit of Provisional Application No. 60/660,257 entitled CELL PHONE/MAGNIFICATION SYSTEM filed Mar. 10, 2005 the subject matter of which is incorporated herein by reference.

BACKGROUND OF THE INVENTION

1. Field of the Invention

The present invention relates to a cell phone or other digital device/magnification system and more particularly pertains to assisting a user to view small alpha-numeric characters in a convenient and economical manner.

2. Description of the Prior Art

The use of visual aids of known designs and configurations is known in the prior art. More specifically, visual aids of known designs and configurations previously devised and utilized for the purpose of viewing alpha-numeric characters through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 6,826,552 issued Nov. 30, 2004 to Grosser relates to apparatus and methods for a computer aided decision-making system. U.S. Pat. No. 6,801,229 issued Oct. 5, 2004 to Tinkler relates to a system for creating a visual representation of data. U.S. Pat. No. 6,768,497 issued Jul. 27, 2004 to Baar relates to elastic presentation space. U.S. Pat. No. 6,668,177 issued Dec. 23, 2003 to Salmimaa relates to a method and apparatus for displaying prioritized icons in a mobile terminal.

While these devices fulfill their respective, particular objectives and requirements, the aforementioned patents do not describe cell phone/magnification system that allows assisting a user to view small alpha-numeric characters in a convenient and economical manner.

In this respect, the cell phone/magnification system according to the present invention substantially departs from the conventional concepts and designs of the prior art, and in doing so provides an apparatus primarily developed for the purpose of assisting a user to view small alpha-numeric characters in a convenient and economical manner.

The primary embodiment of the present invention is the magnification system in association with a cell phone. In stead of the cell phone, the magnification system may be employed with a wide variety of digital devices with small displays for alphanumeric characters.

The magnification systems of the present invention may be used to magnify any of a wide variety of small characters as, for example, credit cards.

The magnification systems of the present invention may be coupled to any of a wide variety of devices, coupling to the device or its case, either as originally manufactured or as an add on or as a retrofit.

Therefore, it can be appreciated that there exists a continuing need for a new and improved cell phone/magnification system which can be used for assisting a user to view small alpha-numeric characters in a convenient and economical manner. In this regard, the present invention substantially fulfills this need.

SUMMARY OF THE INVENTION

In view of the foregoing disadvantages inherent in the known types of visual aids of known designs and configurations now present in the prior art, the present invention provides an improved cell phone/magnification system. As such, the general purpose of the present invention, which will be described subsequently in greater detail, is to provide a new and improved cell phone/magnification system and method which has all the advantages of the prior art and none of the disadvantages.

To attain this, the present invention essentially comprises a cell phone. The cell phone has a front face. The cell phone has a rear face. The cell phone also has parallel side edges. A width is defined between the side edges. The cell phone has parallel top and bottom end edges. A height is defined between the top and bottom edges. The cell phone has a keyboard. The keyboard has keys. The keys are adapted to be depressed by a user. In this manner data is entered. The keyboard extends upwardly from the bottom end edge of the front face for in excess of 50 percent of the height of the front face. The cell phone has a display panel. The display panel is adapted to be viewed by a user. In this manner data is viewed. The display panel extends upwardly from the top end edge for less than 50 percent of the height of the front face.

A magnifying glass is provided. The magnifying glass has a front face. The magnifying glass has a parallel rear face. The magnifying glass has a periphery. The periphery includes parallel side edges. A width is defined between the side edges. The periphery includes top and bottom end edges. A height is defined between the top and bottom edges. The magnifying glass has a size essentially equal to the size of the display panel. The magnifying glass has an operative orientation above the display panel. The magnifying glass is spaced a short distance from the display panel. In this manner a viewer may read alpha-numeric characters and an enlarged magnification. The magnifying glass has an inoperative orientation remote from the cell phone and display panel for transportation and storage purposes.

Provided last is a coupling assembly. The coupling assembly has a coil spring. The coil spring is formed of a plastic material centrally. The coupling assembly has an interior loop at one end. The coupling assembly has an exterior loop at the other end. The coupling assembly also has a projection. An opening is provided on one side edge of the cell phone. The opening receives the interior loop. A hole is provided through the center of the top end edge of the periphery of the magnifying glass. A ring is provided. The ring connects the hole and the exterior loop. In this manner the magnifying glass is coupled with respect to the cell phone during the movement of the magnifying glass with respect to the display panel of the cell phone between the operative orientation and the inoperative orientation.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved cell phone/magnification system which has all of the advantages of the prior art visual aids of known designs and configurations and none of the disadvantages.

It is another object of the present invention to provide a new and improved cell phone/magnification system which may be easily and efficiently manufactured and marketed.

It is further object of the present invention to provide a new and improved cell phone/magnification system which is of durable and reliable constructions.

An even further object of the present invention is to provide a new and improved cell phone/magnification system which is susceptible of a low cost of manufacture with regard to both materials and labor, and which accordingly is then susceptible of low prices of sale to the consuming public, thereby making such cell phone/magnification system economically available to the buying public.

Even still another object of the present invention is to provide a cell phone/magnification system for assisting a user to view small alpha-numeric characters in a convenient and economical manner.

Lastly, it is an object of the present invention to provide a new and improved cell phone or other digital device/magnification system. A magnifying glass has a size essentially equal to the size of a display panel of a cell phone or other digital device. A coupling assembly has an interior. The interior is adapted to be coupled with respect to a cell phone or other digital device. The coupling assembly has an exterior. The exterior is coupled to the magnifying glass. In this manner the cell phone or other digital device is coupled to the magnifying glass during the movement of the magnifying glass with respect to a display panel of a cell phone or other digital device.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
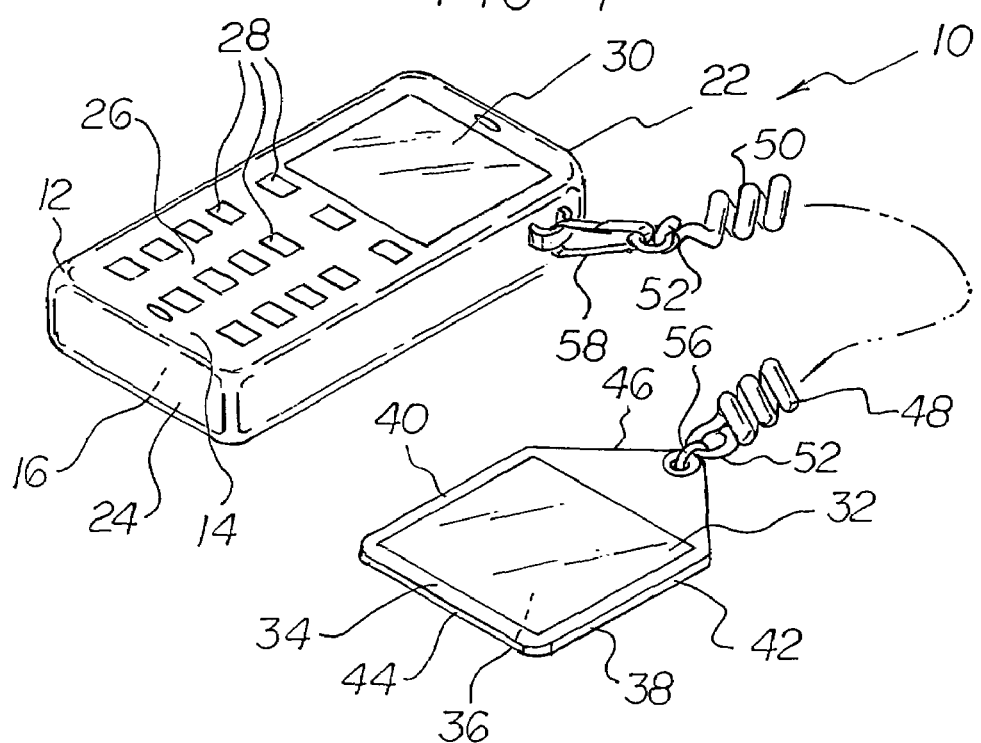
FIG. 1 is perspective illustration of a cell phone/magnification system constructed in accordance with the principles of the present invention.
Figure 2:
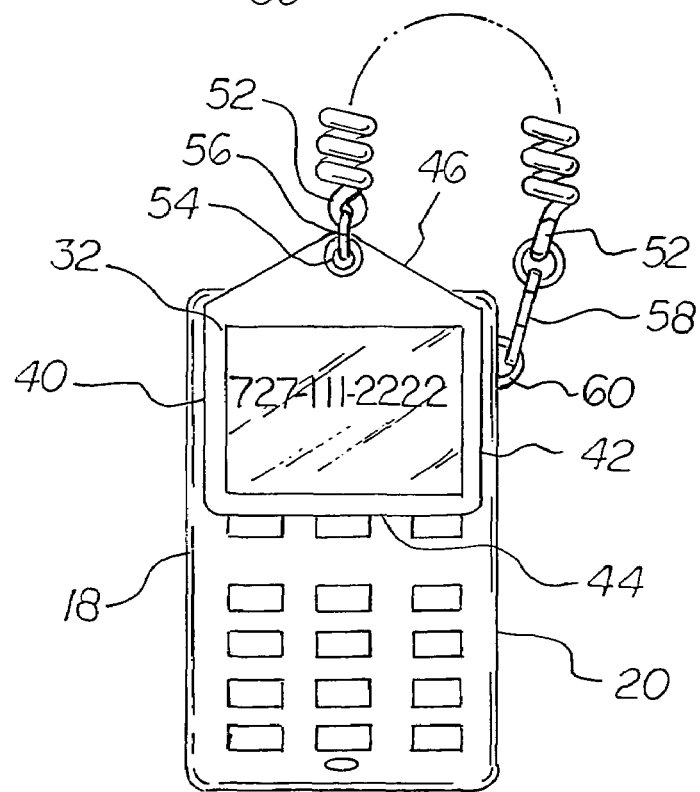
FIG. 2 is a front elevational view of the system shown in FIG. 1 but with the magnification system in the operative orientation.

With reference now to the drawings, and in particular to FIG. 1 thereof, the preferred embodiment of the new and improved cell phone/magnification system embodying the principles and concepts of the present invention and generally designated by the reference numeral 10 will be described.

The present invention, the cell phone/magnification system 10 is comprised of a plurality of components. Such components in their broadest context include a magnifying glass and a coupling assembly. Such components are individually configured and correlated with respect to each other so as to attain the desired objective.

First provided is a cell phone 12. The cell phone has a front face 14. The cell phone has a rear face 16. The cell phone also has parallel side edges 18, 20. A width is defined between the side edges. The cell phone has parallel top and bottom end edges 22, 24. A height is defined between the top and bottom edges. The cell phone has a keyboard 26. The keyboard has keys 28. The keys are adapted to be depressed by a user. In this manner data is entered. The keyboard extends upwardly from the bottom end edge of the front face for in excess of 50 percent of the height of the front face. The cell phone has a display panel 30. The display panel is adapted to be viewed by a user. In this manner data is viewed. The display panel extends upwardly from the top end edge for less than 50 percent of the height of the front face.

A magnifying glass 32 is provided. The magnifying glass has a front face 34. The magnifying glass has a parallel rear face 36. The magnifying glass has a periphery 38. The periphery includes parallel side edges 40, 42. A width is defined between the side edges. The periphery includes top and bottom end edges 44, 46. A height is defined between the top and bottom edges. The magnifying glass has a size essentially equal to the size of the display panel. The magnifying glass has an operative orientation above the display panel. The magnifying glass is spaced a short distance from the display panel. In this manner a viewer may read alpha-numeric characters and an enlarged magnification. The magnifying glass has an inoperative orientation remote from the cell phone and display panel for transportation and storage purposes.

Provided last is a coupling assembly 48. The coupling assembly has a coil spring 50. The coil spring is formed of a plastic material centrally. The coupling assembly has an interior loop 52 at one end. The coupling assembly has an exterior loop 52 at the other end. The coupling assembly also has a projection. An opening 54 is provided on one side edge of the cell phone. The opening receives the interior loop. A hole 54 is provided through the center of the top end edge of the periphery of the magnifying glass. A ring 56 is provided. The ring connects the hole and the exterior loop. A clip 58, attached to interior loop 52, removably couples to the cell phone through hook 60. A similar clip is readily used at either end or both ends of the connector. In this manner the magnifying glass is coupled with respect to the cell phone during the movement of the magnifying glass with respect to the display panel of the cell phone between the operative orientation and the inoperative orientation. The removable clip facilitates to use of the magnifying glass with a credit card or other small remote object to be magnified and read.

Figure 3:
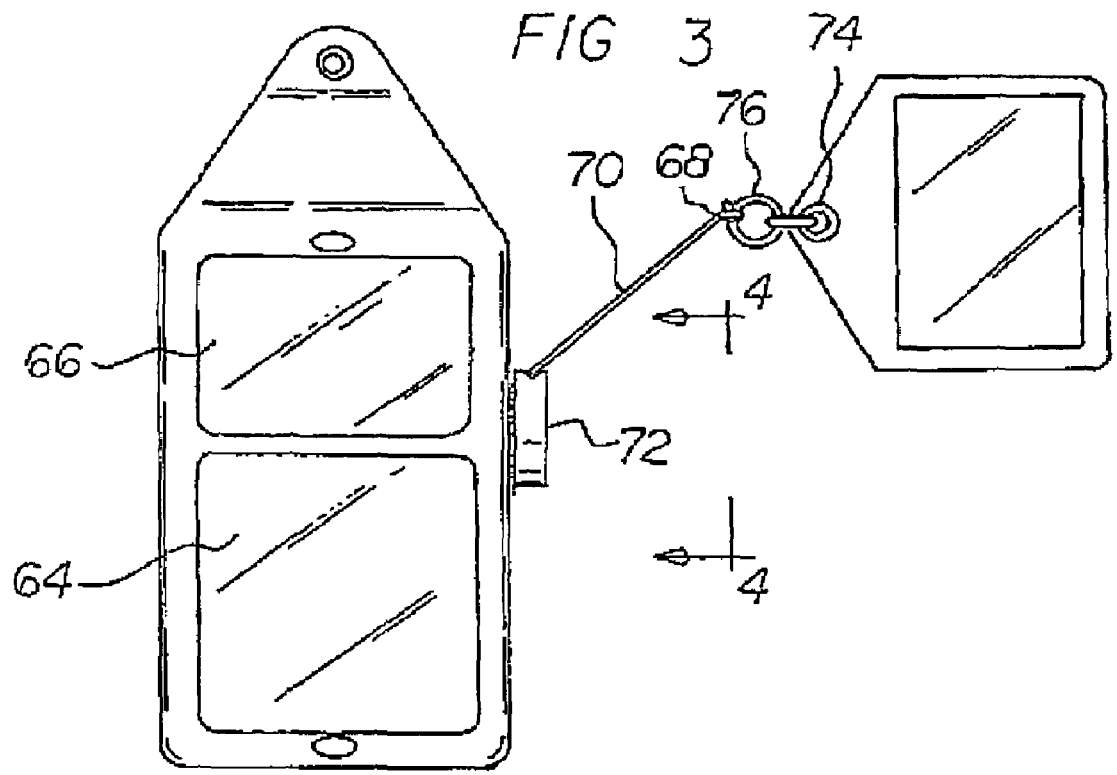
FIG. 3 is front elevational view of an alternate embodiment of the system.
Figure 4:
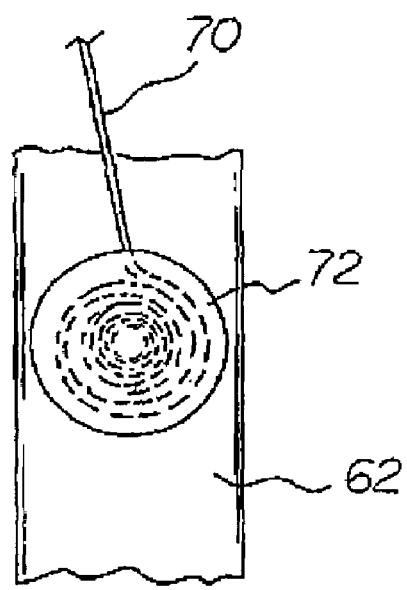
FIG. 4 is side elevational view taken along line 4-4 of FIG. 3.

An alternate embodiment of the present invention is illustrated in FIGS. 3 and 4. In such embodiment, a cover 62 is provided. The cover is positionable over a cell phone. The cover has a lower window 64. The lower window exposes the buttons of a cell phone. The cover has an upper window 66. The upper window exposes a display panel of a cell phone. A coupling assembly 68 is provided. The coupling assembly includes a string 70 centrally. The coupling assembly includes a coiling unit 72. The coiling unit is interiorly coupled to a side of the cover. A hole 76 is provided in the periphery of the magnifying glass. At least one loop 74 is provided. The loop couples the string and the magnifying glass. It should be understood that the magnifying system and coupling components could be manufactured and sold with the cell phone or its case. In the alternative, the magnifying system and coupling components could be manufactured and sold as a retrofit for the cell phone or its case.

Figure 5:
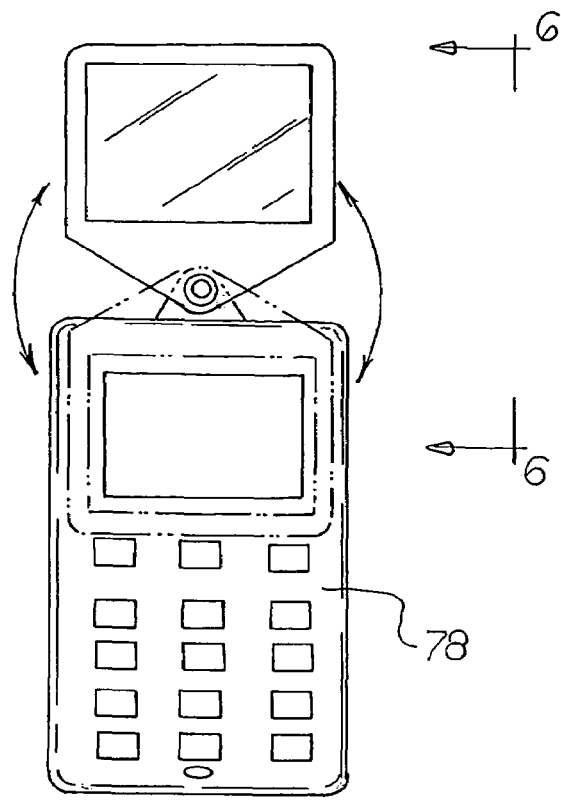
FIG. 5 is front elevational view of another alternate embodiment of the system.
Figure 6:
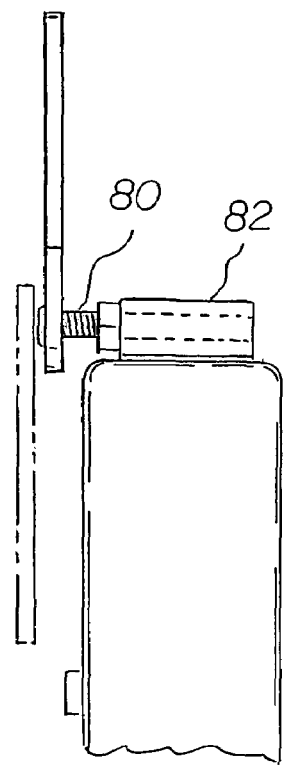
FIG. 6 is side elevational view taken along line 6-6 of FIG. 5.

Another alternate embodiment of the present invention is illustrated in FIGS. 5 and 6. In such embodiment, a cell phone 78 is provided. The coupling assembly includes a bolt 80. The bolt has a head. The head is attached to the magnifying glass. The coupling assembly includes a threaded sleeve 82. The threaded sleeve receives the bolt. In this manner the magnifying glass may be rotated with respect to the display panel of the cell phone between the operative orientation and the inoperative orientation and for varying the distance between the display panel and the magnifying glass. Note FIGS. 5 and 6.

Figure 7:
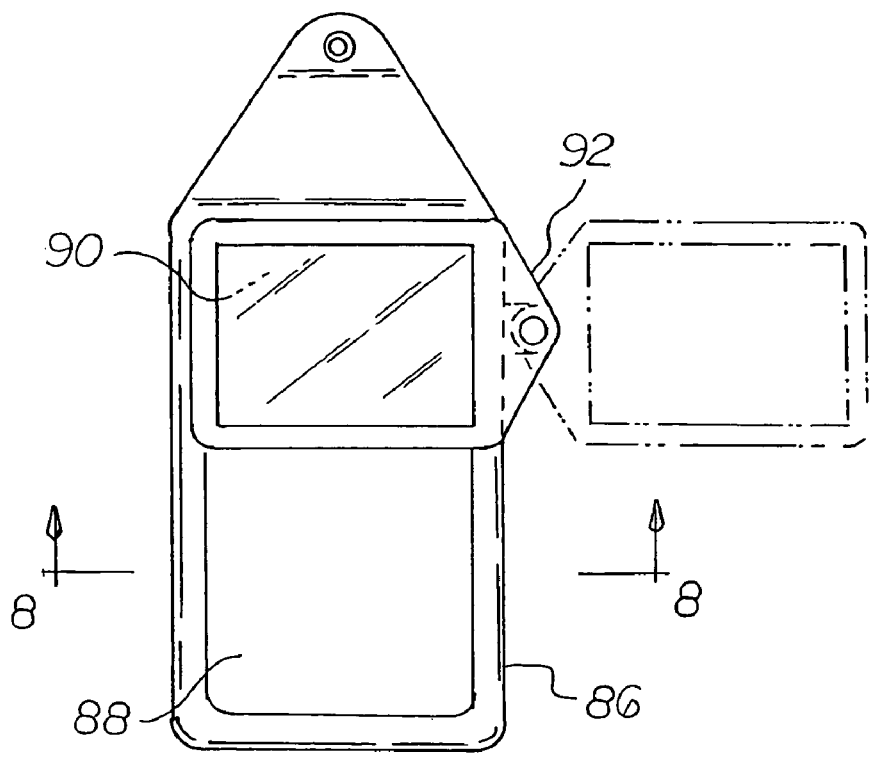
FIG. 7 is front elevational view of the final alternate embodiment of the system.
Figure 8:
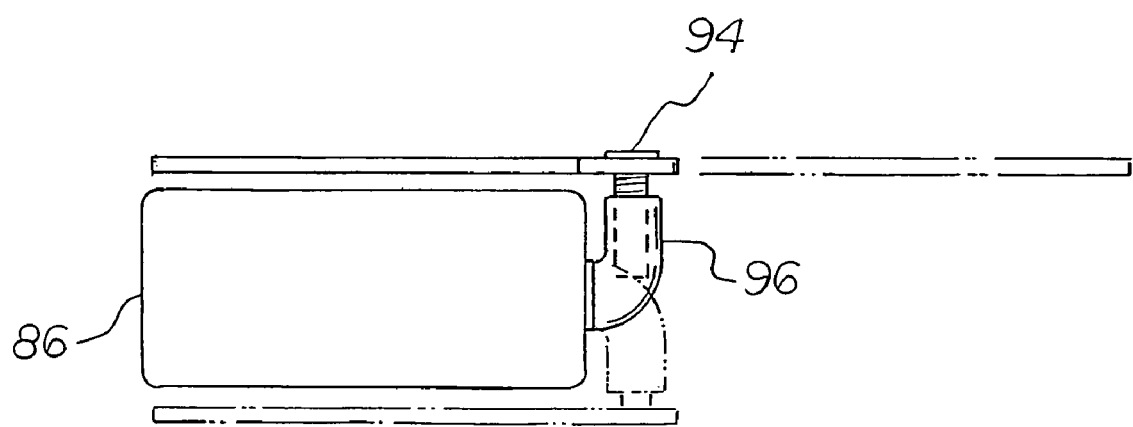
FIG. 8 is cross sectional view taken along line 8-8 of FIG. 7.

FIGS. 7 and 8 illustrate the final alternate embodiment of the present invention wherein a cover 86 is provided. The cover is positionable over a cell phone. The cover has a lower window 88. The lower window exposes the buttons of a cell phone. The cover has an upper window 90. The upper window exposes a display panel of a cell phone. A coupling assembly 92 is provided. The coupling assembly includes a bolt 94. The bolt has a head. The head is attached to the cover. The coupling assembly includes a threaded sleeve 96. The threaded sleeve is coupled to the bolt. In this manner the magnifying glass may be rotated with respect to the display panel of the cell phone between the operative orientation and the inoperative orientation and for varying the distance between the display panel and the magnifying glass. Note FIGS. 7 and 8.

Utilized in the embodiment of FIGS. 5 and 6, as well as the embodiment of FIGS. 7 and 8, is a cylindrical support member in the form of a threaded bolt adapted to be rotated in a threaded cylindrical housing so as to vary the distance between the lens and the image to be viewed and magnified. It should be understood that such function could be attained by other than the cylindrical support members as shown. Consider, for example, a non-threaded cylindrical rod adapted to be adjustably received within a non-threaded recipient cylindrical housing with adjustments in distances being carried out by a telescoping action caused by rotational and axial movement of the rod.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A digital/magnification system comprising:
    a cell phone having buttons below and a display panel above;
    a magnifying glass having a size and shape essentially equal to the size and shape of the display panel of the cell phone;
    a cover removably receiving the cell phone, the cover having a lower window for exposing the buttons of the cell phone and an upper window for exposing the display panel of the cell phone;
    a coupling assembly having an interior end coupled to an exterior surface of the cover between the upper and lower windows and an exterior end coupled to the magnifying glass to thereby couple the magnifying glass with respect to the cell phone and cover during the movement of the magnifying glass with respect to the buttons and the display panel of the cell phone; and
    the coupling assembly including a string centrally with a coiling unit interiorly coupled to a side of an exterior surface of the cover and with a hole in the periphery of the magnifying glass with at least one loop coupling the string and the magnifying glass.

* * * * *